United States Patent
Ball et al.

(10) Patent No.: US 6,502,079 B1
(45) Date of Patent: Dec. 31, 2002

(54) METHOD AND SYSTEM FOR ENFORCING FLOATING LICENSES

(75) Inventors: Scott Richard Ball, Rochester, NH (US); Joseph H. Greenwald, East Waterboro, ME (US); Bob Jones, Barrington; Kyle Pause, Dover, both of NH (US)

(73) Assignee: Aprisma Management Technologies, Inc., Portsmouth, NH (US)

( * ) Notice: Subject to any disclaimer, the term of this patent is extended or adjusted under 35 U.S.C. 154(b) by 0 days.

(21) Appl. No.: 08/986,947

(22) Filed: Dec. 8, 1997

(51) Int. Cl.[7] .............................................. G06F 17/60
(52) U.S. Cl. ......................................... 705/59; 705/400
(58) Field of Search ................................ 705/400, 410, 705/59, 51, 52; 377/13, 14, 15, 16; 380/3, 4; 968/605; 713/200

(56) References Cited

U.S. PATENT DOCUMENTS

| | | | | |
|---|---|---|---|---|
| 5,014,234 A | * | 5/1991 | Edwards, Jr. | 713/200 |
| 5,113,518 A | * | 5/1992 | Durst, Jr. et al. | 713/200 |
| 5,386,369 A | * | 1/1995 | Christiano | 705/400 |
| 5,579,222 A | * | 11/1996 | Bains et al. | 395/712 |
| 5,708,709 A | * | 1/1998 | Rose | 705/59 |
| 5,758,068 A | * | 5/1998 | Brandt et al. | 705/59 |
| 5,771,347 A | * | 6/1998 | Granz et al. | 713/200 |
| 5,940,504 A | * | 8/1999 | Griswold | 705/59 |

FOREIGN PATENT DOCUMENTS

JP 410003386 A * 1/1998

OTHER PUBLICATIONS

Hauser, Ralf; "Does licensing require new access control techniques?"; Nov. 1994; Communications of the ACM v37n11 pp. 48–55; dialog copy pp: 1–10.*

* cited by examiner

Primary Examiner—James P. Trammell
Assistant Examiner—Thomas A. Dixon
(74) Attorney, Agent, or Firm—Paul M. Coryea

(57) ABSTRACT

A floating license enforcement method and system which enables an authorized user to accumulate time-based usage credit while a software application is in use under a valid license. In the event of a license system fault, the application remains accessible to the user, while consuming the usage credit which was previously accumulated. This allows the user access to the application while the license system fault is being corrected. If the license system fault is corrected before all of the accumulated usage credit is consumed, the application remains accessible to the user under the valid license and resumes accumulating usage credit. Therefore, the invention allows the authorized user to consume its accrued usage credit to bridge the time between when a license system fault occurs and when the fault is corrected, thereby protecting the rights of the user. At the same time, the invention prevents excessive unauthorized use of the application, thereby protecting the rights of the software vendor.

33 Claims, 5 Drawing Sheets

METHOD AND SYSTEM FOR ENFORCING FLOATING LICENSES

BACKGROUND OF THE INVENTION

1. Field of the Invention

This invention relates generally to computer software licensing, and more particularly to the management and enforcement of floating licenses of computer applications.

2. Discussion of the Related Art

Many computer software applications are subject to electronic software licenses which determine a user's right to use the particular application. An electronic software license serves the dual purpose of: 1) allowing access to the software by the licensed user; and 2) allowing the software vendor to control how much the application is used and to ensure that only authorized users have access to the application.

In the case of a network computer system, there may be many users with potential access to the application. In this case, the software license must be able to grant access to authorized users who require access, while preventing access by unauthorized users.

There are three licensing models commonly used: node-lock licenses; concurrent floating licenses; and usage-based licenses. Each model is discussed below in greater detail.

A node-lock license is the simplest of the three models, and also the most inflexible. A node-lock license is tied to a particular host by information that is unique to that host. This information (by which the license is tied to the particular host) often includes the host's ethernet address or the serial number of one of the host's hard drives. The licensed application cannot be moved to another host without contacting the software vendor and acquiring another node-lock license for the new host. Due to the relative simplicity of the node-lock license, license system failures rarely occur. Due to the inflexibility of the node-lock license, there is no leniency in enforcing the license. Either the host has a license, and therefore access to the application, or it does not.

A concurrent floating license, on the other hand, is much more flexible and at the same time much more complex. With a concurrent floating license, any host connected to the network can request a license. The increased complexity of the concurrent floating license means that the acquisition of a licensed application can be hindered, either by faults related to the additional processes involved in the acquisition of the license or by any network faults that may occur. If any of these faults occur while the license is being requested, the user may not be granted a license. In such a case, the application determines whether, in this situation, the failed license acquisition requires a denial of service to the user or if the application is allowed to be used without the required license. The software vendor typically programs the software to determine in what circumstances access will be granted or denied.

A usage-based license differs from the node-lock license and the concurrent floating license in that it does not license a software application as a whole. The usage-based license monitors the amount that the licensed application is actually used and presents the user with a bill at regular intervals. Usage-based licenses record the amount of usage and generally report the usage to a central billing system. Network and license system faults do not pose an obstacle to the user of the application since access to the application is always granted. However, this type of licensing poses problems for the software vendor who must control use of the application.

The type of license used may be extremely important, especially when the application is a "mission-critical" application. A mission-critical application is indispensable to the user, such that any downtime of the application is not tolerable. An example of a mission-critical application is a network management system. A network management system (NMS) is responsible for monitoring an organization's computer network and diagnosing the origin of any faults that may occur in the network. Such a network is illustrated in FIG. 1, which shows a network management server 300 which monitors and controls a number of interconnected network devices D. Since many organizations depend on computer networks to transact business, and/or for research and development, the accessibility of the network is critical to the survival of the organization. A failure to access the NMS, such as during a license system fault, could be catastrophic to the organization. Therefore, the NMS must always be accessible to the network manager, even in the event of a license system failure.

Enforcement of concurrent floating licenses is conventionally done according to two different enforcement strategies commonly referred to as "strict enforcement" and "absolute leniency". Strict enforcement means that, at any time, if the concurrent floating license fails, the user is denied access to the software application. As discussed above, in the case of a critical application where access to the software application is essential to the welfare of the user's business, strict enforcement is unacceptable as downtime (due to a licensing system fault) is intolerable.

Absolute leniency allows the user access to the software application during periods of license system fault. Absolute leniency has the potential to allow a software vendor to grant access during software or network faults, but deny access when the amount of authorized licenses is exceeded. However, it is difficult, if not impossible, to determine if a license system fault is one where the user should be granted leniency (access), or if the license system fault is due to overuse of the software application license.

While uninterrupted accessibility of a licensed critical application is crucial to the user, the software vendor who licenses the application has an interest in policing use of the application to insure against unauthorized users. Absolute leniency is unacceptable to the software vendor because it is impossible to control the number of users who have access. Such leniency defeats the purpose of a license, which is to control unauthorized use of the software application.

Therefore, to protect the rights of both the user and the vendor in the case of a license system fault, a compromise between strict enforcement and absolute leniency is desired. Such a compromise should provide leniency to allow mission-critical applications to continue operating until the license system fault is corrected. At the same time, the software vendor's interest in protecting its software from unauthorized use must be addressed.

SUMMARY OF THE INVENTION

According to the invention, a system is provided which solves the problems discussed above. The system enables a licensed user to accumulate time-based usage credit while a critical application is in use under a license. In the event of a license system fault, the application remains accessible to the user, while consuming the usage credit which was previously accumulated. This allows the user access to the application while the license system fault is being corrected.

If the license system fault is corrected before all of the accumulated usage credit is consumed, the application remains accessible to the user under the license and the user resumes accumulating usage credit. If the license system fault is not corrected before all of the accumulated usage credit is consumed, the application is terminated. Therefore, the present invention allows the authorized user to consume its accumulated usage credit to bridge the time between when a license system fault occurs and when the fault is corrected, thereby protecting the rights of the user. At the same time, the invention prevents any unlicensed users from accessing the application during license system faults, thereby protecting the rights of the vendor.

According to one embodiment of the invention, a method of enforcing a floating license of a computer software application is provided, the method including the steps of accumulating credit while using the application under a first condition and consuming the accumulated credit while using the application under a second condition different than the first condition. The first condition comprises use of the application when the license is valid, and the second condition comprises use of the application when the license is invalid, such as during a license system fault. During the accumulating step, credit is accumulated at a predetermined accumulation rate. During the consuming step, the accumulated credit is consumed at a predetermined consumption rate. The consumption rate is adjustable within a first range when the application is in use, and adjustable within a second range when the application is not in use.

According to another embodiment of the invention, a method for managing the enforcement of a floating license of a computer application is provided, the method including the steps of accumulating usage credit while the application is being used while the floating license is valid, and consuming the usage credit at a first rate while the application is being used while the floating license is invalid.

According to another embodiment of the invention, a system for managing the enforcement of a floating license for a computer application is provided. The system includes a device for accumulating usage credit while the application is being used while the floating license is valid, and a device for consuming the usage credit while the application is being used while the floating license is invalid.

According to yet another embodiment of the invention, a computer program product comprises a computer-readable medium having a computer program logic thereon for enabling a processor in a computer system to manage the enforcement of a license of a software application. The product includes means for providing a finite grace period to operate the software application when the license is invalid, wherein the length of the finite grace period is proportional to the length of operation of the software application while the license is valid. The product further comprises means for terminating the software application when the finite grace period expires.

According to yet another embodiment of the invention, a system is provided for managing leniency in the enforcement of a floating license for a computer application, the system including an accumulation device which accumulates usage credit while the application is being used while said floating license is valid, a consumption device which consumes the usage credit while the application is used while the floating license is invalid and a controller which controls operation of the accumulation device and the consumption device.

These and other features of the present invention will be more particularly understood from the following detailed description.

DETAILED DESCRIPTION

Figure 1:
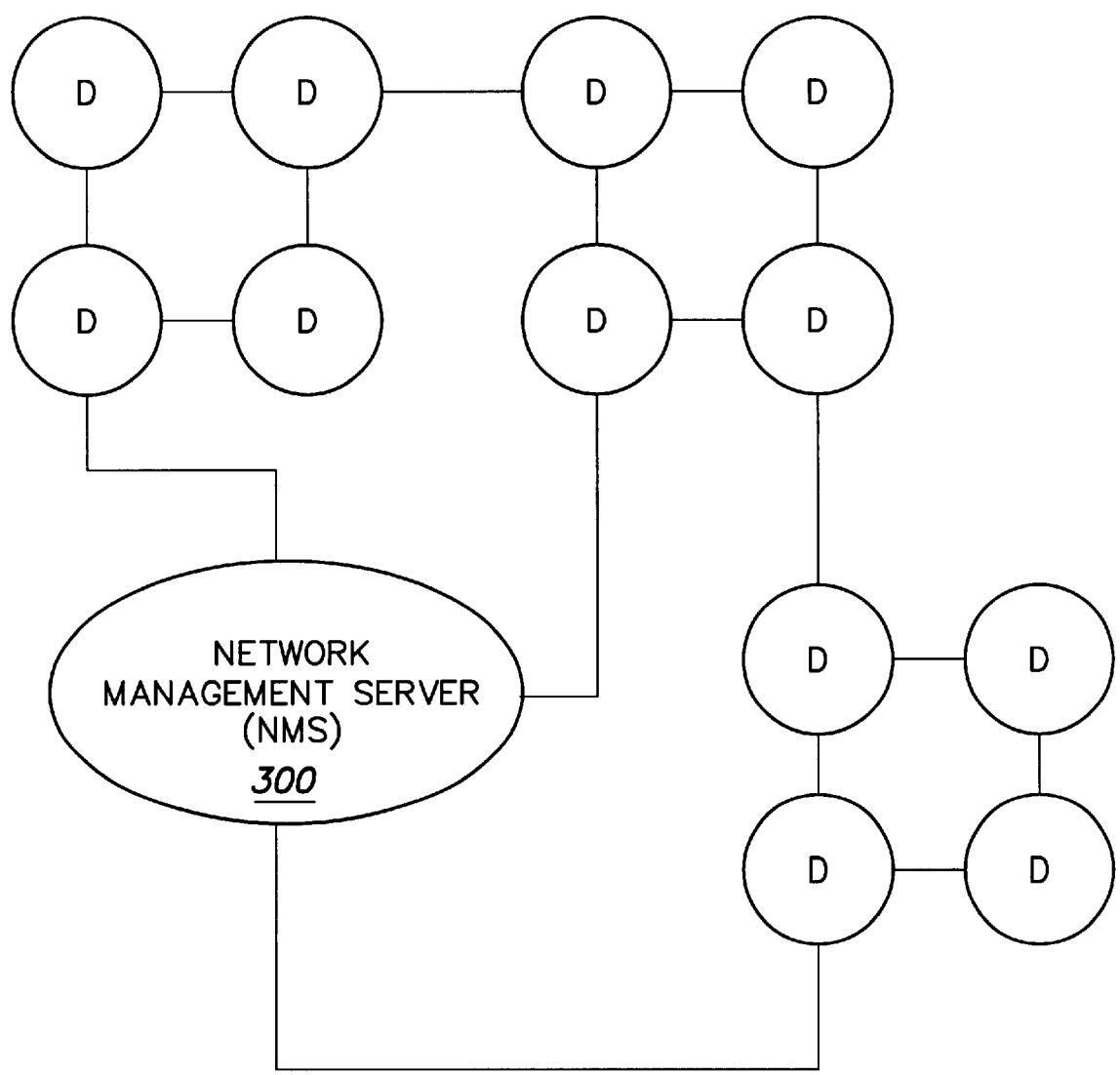
FIG. 1 is a schematic diagram of a communications network on which the present invention may be implemented.

According to one embodiment of the present invention, a system and method are provided for managing leniency of a floating license by using an earned credit mechanism. Generally, as a network user operates a computer software application under a license, the user accumulates credit which, in this embodiment take the form of parcels of time, called "credit tokens," where one credit token represents a specific length of time. Therefore, as long as the software application is being operated under a license, the application is earning credit (time) for future use. In the case of a license system fault, when the license is invalid, the earned credits are consumed to allow the user of the software application uninterrupted accessibility. The period in which the application is running unlicensed is referred to as a "grace period". During the grace period, the application consumes the credit tokens which were accumulated while the application was operating under the license. If the license system fault is not corrected before all of the accumulated credit is consumed, the application is terminated.

The accumulation of credit tokens which are then consumed during a license system fault addresses the concerns of the user of the application, since the authorized user is assured that a license system failure will not prevent access to the application.

In order to address the concerns of the software vendor, the invention provides a means for controlling the amount of credit which may be accumulated and saved by the user. The invention controls the accumulation of credit tokens by, for example, enforcing an accumulation ceiling and/or by varying the rates of accumulation and consumption of the credit tokens while the application is in use.

An accumulated credit token ceiling is used to limit the amount of credit that may be accumulated. This prevents the stockpiling of large quantities of credit which may be consumed during a license system fault, allowing unlicensed use of the application for extended periods of time after the fault is corrected. The accumulated credit token ceiling is typically set to provide a grace period which allows enough time for a license system fault to be corrected. The length of the grace period will vary depending on the particular application to which the invention is applied. The amount of accumulated credit is also controlled by varying the rates at which credit tokens are accumulated and consumed.

For ease in describing a specific embodiment, one credit token will be equal to one hour of time. It will be understood, however, that any amount of time may be assigned to a credit token. Also, in the context of this description, unlicensed applications are applications which are being used either in addition to applications being used under a license or applications used during a license system fault.

The rate of accumulation may be varied to control the amount of credit which is accumulated while the application is being used under a license. The selection of the rate of accumulation depends on how strictly the vendor desires to regulate the use of the application.

If the vendor chooses to be lenient, an accumulation rate, Ar, may be chosen such that credit is accumulated at a rate faster than actual usage time. For example, if Ar=2, the application will accumulate credit tokens twice as fast as the application is used. This means that, with one credit token equal to one hour of use, for each hour that the licensed application is used, two hours of credit will be accumulated, up to the credit ceiling.

On the other hand, if the vendor chooses to be more restrictive, the accumulation rate can be adjusted so that credit is accumulated at a much slower rate. For example, if Ar=0.25, for every four hours of licensed use, one hour of credit is accumulated.

The present embodiment may employ two different rates for the consumption of credit tokens. The first rate of consumption is in effect while the application is being used during a license system fault, while the license is invalid (i.e., during the grace period). This consumption rate is called the rate of "graced consumption." An optional second rate of consumption is in effect during periods of time when the application is not in use. This consumption rate is called the rate of "extinct consumption." Extinct consumption prevents the accumulation of large sums of credit tokens for use in the future. Extinct consumption may be used if the software vendor does not want to allow the licensee to hold large amounts of credit tokens if the application is not being used.

The rates of graced consumption and extinct consumption will also vary depending on the vendor's goals in protecting its software.

An exemplary rate of graced consumption, Gr, would be Gr=−4, whereby, for every hour of unlicensed use, four hours worth of credit tokens are consumed. By increasing or decreasing the number of credit tokens consumed during unlicensed use, the vendor can tailor the license to provide the amount of leniency which is satisfactory to both the vendor and the application user.

An alternative to a constant graced consumption rate, as described above, is a graced consumption rate which increases over time. In this case, at the onset of unlicensed use, the rate begins at a set rate which increases either linearly or exponentially over time until either all of the accumulated credit is consumed (and the application terminated), or until the license system fault is corrected. In this case, if an application is running without a license for a long period of time, it is assumed that a license is not available for the application, and therefore the application will be terminated.

Extinct consumption, Er, as described above, is the consumption rate when the licensed application is not running. The rate of extinct consumption is typically lower than the rate of graced consumption. For example, if Er=−0.1, for every ten hours of nonuse of the licensed application, one hour of credit will be consumed.

The maximum number of applications in use at any time, AU, may be greater than the number of licensed applications L. The maximum number of applications in use, AU, operating either under a license (i.e., accumulating tokens) or operating during graced consumption (i.e., consuming tokens), is the number of licensed applications L plus the number of accumulated tokens T, or AU=L+T. This means that, in a system which has five licenses and has accumulated fifty tokens, the five licensed applications will be allowed to operate and the fifty tokens will either be saved for future use or consumed by unlicensed applications. In the event of a license system failure, the maximum number of applications in use at one time, fifty in this example, may be divided among all potential users. Given a number of users of the software, X, the amount of tokens T available for each user can be determined using the formula:

$$T = AU/X$$

In other words, one user could run one application for fifty hours. On the other hand, fifty users could run one application for one hour. Of course, the number of tokens T may be divided among any number of users and applications; for example, ten applications could be run for five hours each.

However, since the unlicensed applications will most likely be subject to a graced consumption rate Gr that is greater than −1, i.e., one hour consumed for one hour of licensed use, the actual time available for unlicensed use will be less than the total number of accumulated tokens. For example, if Gr=−2, then each of the ten applications discussed above would only be available for 2.5 hours (rather than five hours, which would be the length of the grace period if Gr=−1).

The rate of accumulation, the rate of graced consumption and the rate of extinct consumption are all chosen depending on the specific needs of the user of the application and/or the vendor who is providing the application. In an embodiment where there is a number of licensed applications L, the possible number of such licensed applications which may be running at any given time, AU, must fall within one of two ranges described below.

If all licensed applications L are available to the user, the possible number of applications in use AU will be within the range:

$$L \leq AU \leq L+C;$$

where C is the accumulated credit token ceiling.

This means that the possible number of applications in use AU cannot be less than the number of licensed applications L or more than the accumulated token ceiling C plus the number of licensed applications L. Also, in this case as described below, unlicensed applications NL will be allowed to run in addition to the licensed applications, the consequence being that each unlicensed application will consume, at the graced consumption rate, credit that is accumulated by the licensed applications.

If instead, due to a license system fault, all licensed applications L are not available, the possible number of applications in use AU falls within the range:

$$T \leq AU \leq C;$$

meaning that the possible number of applications in use AU cannot be less than the number of available tokens T, or more than the accumulated token ceiling C.

The system on which the applications are running periodically, for example, at every time interval that one credit token represents, calculates and stores the current number of tokens available to the system T using the following formula:

$$T = (L \cdot Ar) + (NL \cdot Gr) + Tp;$$

where NL is the number of unlicensed applications and Tp is the number of tokens available to the system as a result of the previous token number calculation. In this calculation, L·Ar represents the number of credit tokens accumulated by licensed applications and NL·Gr represents the number of credit tokens consumed by unlicensed applications. It is understood that T cannot exceed the accumulated token ceiling C.

The effect that the rates of accumulation Ar and graced consumption Gr have on the number of applications in use AU is shown in the following formula:

$$L \cdot Ar = NL \cdot |Gr|$$

This formula shows a system which operates at a 1:1 accumulation to consumption ratio. In other words, unlicensed applications consume credit tokens at the same rate that licensed applications accumulate them. This formula can be manipulated to control the ratio of unlicensed to licensed applications that are allowed to run. For example, in order to adjust the accumulation rate Ar and the graced consumption rate Gr to allow only twenty-five (25) percent of the applications running to be unlicensed, the above formula may be rewritten as follows:

$$4L \cdot Ar = NL \cdot |Gr|$$

which is equivalent to:

$$4L/NL = |Gr|/Ar.$$

Using this formula, the ratio of graced consumption Gr to accumulation Ar can be determined so that each unlicensed application consumes four tokens for each token accumulated by the licensed applications.

Figure 2:
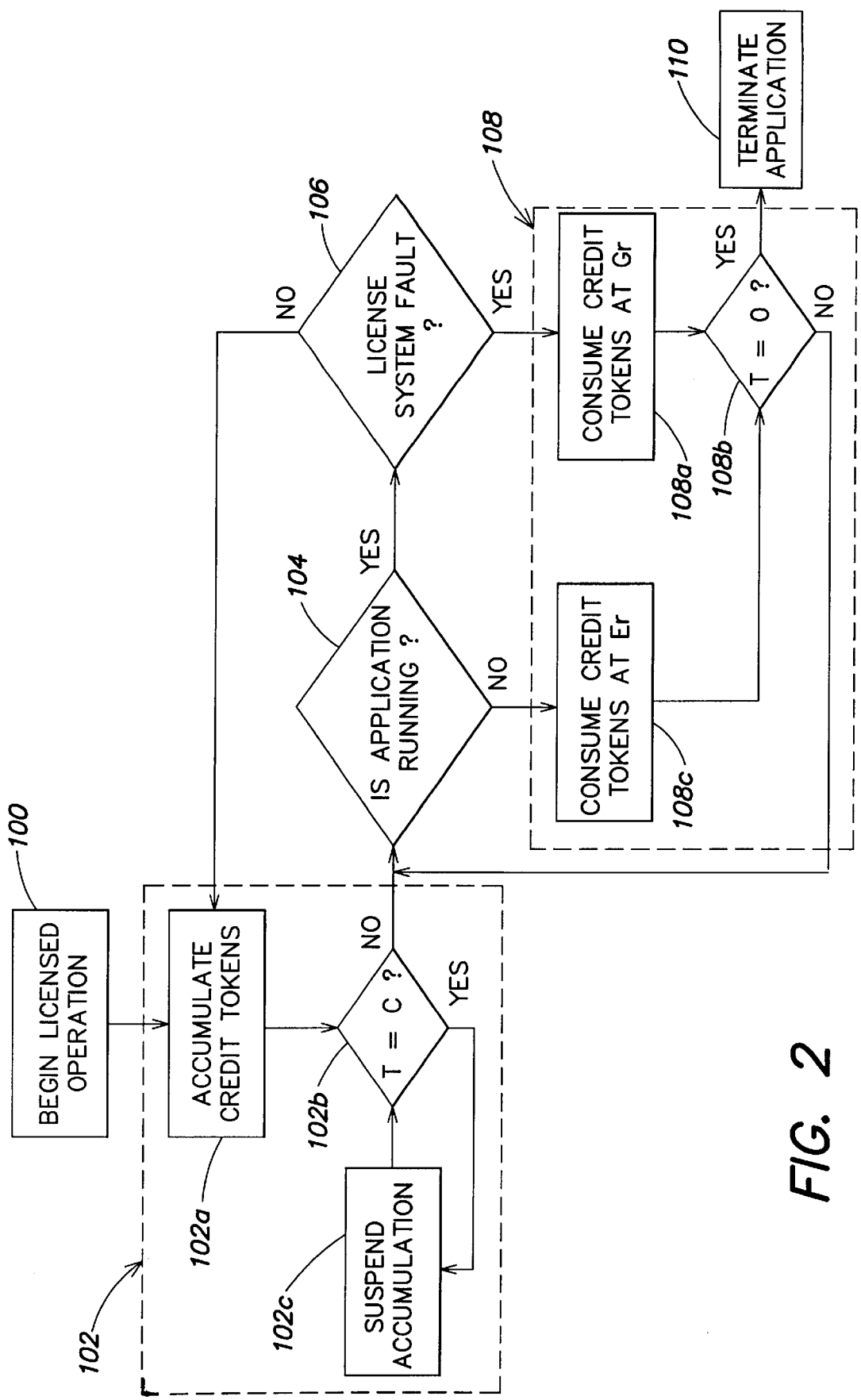
FIG. 2 is a flow diagram which illustrates the steps of the process carried out by the present invention.

FIG. 2 is a flow diagram which illustrates the operation of the present invention. Starting at step 100, licensed operation of the software application begins. The method then enters accumulation block 102, where, at step 102a, credit tokens are accumulated at the accumulation rate, Ar. While credit tokens are being accumulated, the number of credit tokens T accumulated (available) is monitored by the accumulation block 102 at step 102b. If the number of accumulated credit tokens T is equal to the accumulated credit token ceiling C, then credit token accumulation is suspended at step 102c. If, at step 102b, the number of credit tokens T is not equal to (is less than) the accumulated credit token ceiling C, then the method determines if the application is still running, step 104. If the application is still running, the method determines whether a license system fault has occurred at step 106. If a fault has not occurred, the method returns to accumulation block 102 and resumes accumulating and/or monitoring credit tokens. If, at step 106, a license method fault is detected, the method enters consumption block 108. At step 108a, the method consumes the accumulated credit tokens at the graced consumption rate Gr. While the method is consuming credit tokens, the number T of credit tokens is monitored at step 108b. If the number of credit tokens is reduced to zero, the method exits consumption block 108 and terminates the application at step 110. If T is greater than zero, the method returns to block 104 to determine if the application is still running. If it is not, the method enters consumption block 108 and begins consuming credit tokens at the extinct consumption rate Er, at block 108c. While the method is consuming credit tokens, the number T of credit tokens is monitored at step 108b. Again, if the number of credit tokens equals zero (step 108b), the method exits consumption block 108 and terminates the application at step 110.

Figure 3:
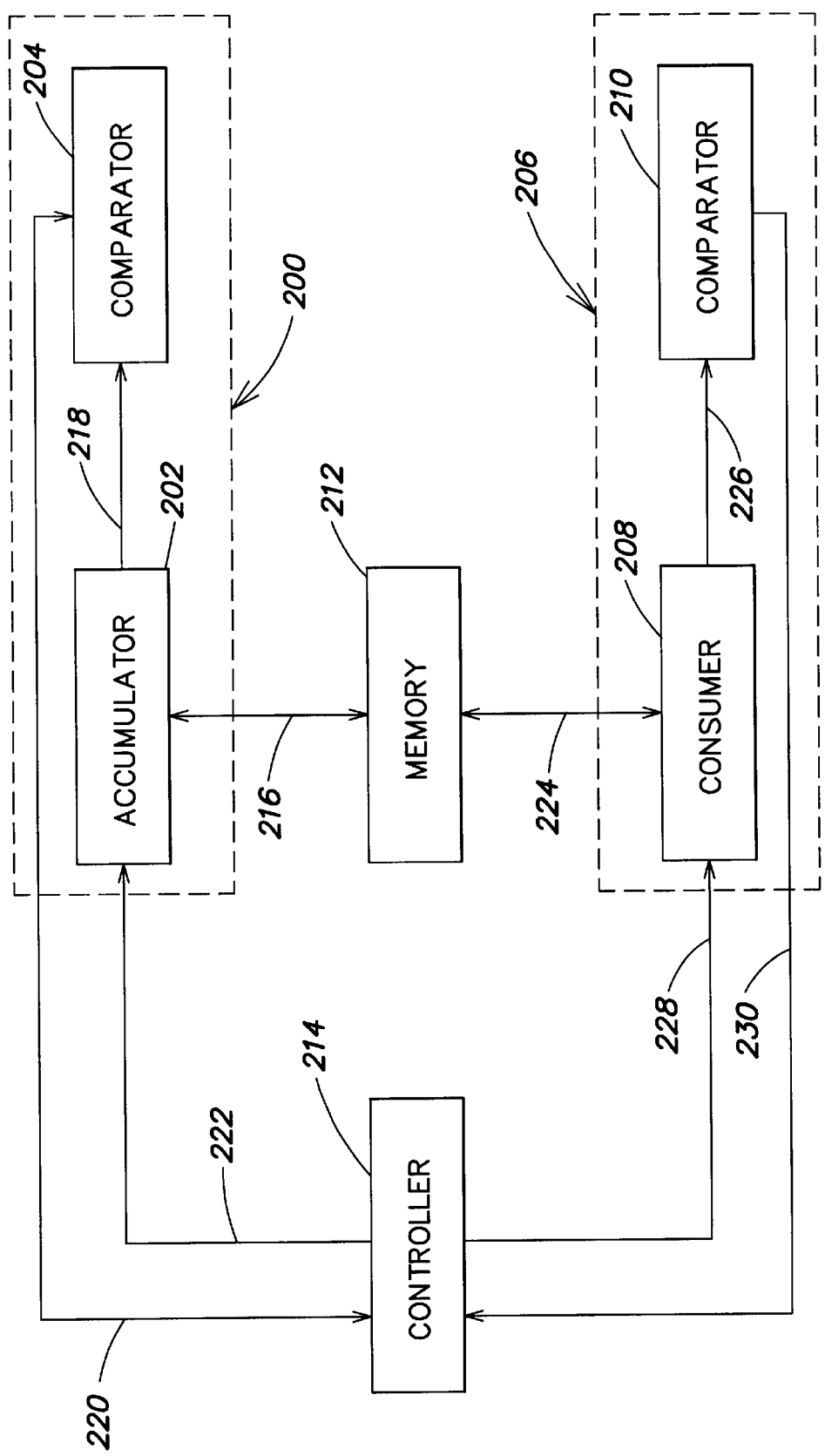
FIG. 3 is a block diagram of the present invention.

FIG. 3 is a block diagram that illustrates a system for carrying out the above-described method. Shown in FIG. 3 is an accumulation block 200, which includes an accumulator 202 and comparator 204. Also shown is a consumption block 206, including consumer 208 and comparator 210. A memory 212 and a controller 214 connect the accumulation and consumption blocks as shown.

Before operation begins, the controller 214 is programmed with the length of time that one credit token represents and the number of credit tokens which constitutes the accumulated credit token ceiling C. When the system begins operation of a licensed application, controller 214 instructs accumulator 202 to begin accumulating credit tokens. As the credit tokens are accumulated, accumulator 202 continuously outputs the number of accumulated credit tokens T to comparator 204 over line 218. Comparator 204 compares the current number of accumulated tokens T with the number of credit tokens which constitutes the accumulated credit token ceiling C, which number is supplied to comparator 204 by controller 214 over bidirectional line 220. If comparator 204 determines that the current number of tokens T equals the accumulated credit token ceiling C, comparator 204 notifies controller 214, which instructs accumulator 202, over line 222, to suspend accumulation and to write the number of accumulated tokens to memory 212 over bidirectional line 216.

Controller 214 also monitors the application to determine whether the application is actually running and whether a license system fault has occurred. If the application is running and there is no license system fault, controller 214 allows accumulator 202 to accumulate tokens until the accumulated credit token ceiling is reached, as described above. If the application is not running, controller 214 instructs consumer 208 to consume credit tokens at the extinct consumption rate Er. Consumer 208 reads the number of accumulated tokens T from memory 212 over bidirectional line 224. As consumer 208 consumes credit tokens, it outputs, over line 226, the current number of tokens to comparator 210, which informs controller 214 over line 228 if the number of credit tokens is zero. When this occurs, controller 214 terminates the application.

If a license system fault occurs, controller 214 instructs accumulator 202 to suspend accumulation (if the ceiling C has not yet been reached), and to write the number of accumulated tokens to memory 212. Controller 214 then instructs consumer 208 to read the number of accumulated tokens from memory 212 and to begin consuming tokens at the rate of graced consumption Gr. Again, as credit tokens are consumed, comparator 210 monitors the number of current tokens and notifies controller 214 when the number of tokens reaches zero.

If the license system fault is remedied before all accumulated credit tokens are consumed, controller 214 instructs consumer 208 to cease consumption and to write the number of current tokens to memory 212. Controller 214 then instructs accumulator 202 to read the number of tokens from memory 212 and to resume the accumulation of tokens. Comparator 204 continuously monitors the number of accumulated credit tokens to determine if the accumulated credit token ceiling has been reached.

Figure 4:
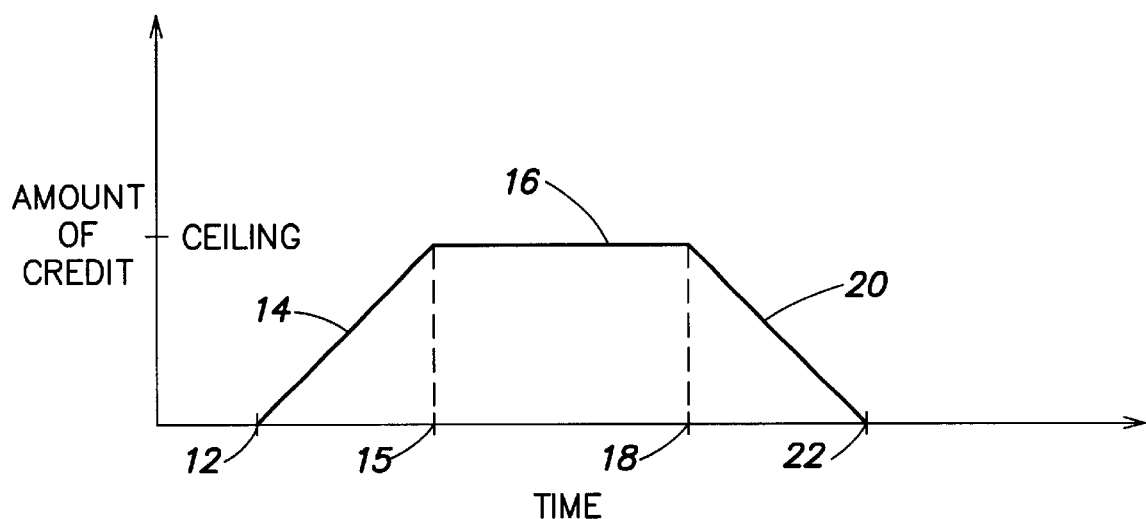
FIG. 4 is a graph which shows how access to a critical software application is managed according to the present invention.

FIG. 4 is a graph of credit versus time which shows how the accumulation rate Ar, the consumption rate Gr and the accumulation ceiling C affect the life of a software application operating under a license which is monitored according to one embodiment of the present invention. When the application begins running under a license, at time 12 on the graph, credit is accumulated as shown by the positive slope of line 14, until the accumulation ceiling is reached at time 15. From time 15 to time 18 while the slope is flat—line 16, the application is running fully licensed, but the accumulation of credit is suspended. At time 18 on the graph, a license system fault occurs. The application continues running, but is now unlicensed. This is the grace period. In order to keep the application running, credit is consumed at the rate of graced consumption, as indicated by the negative slope of line 20. If the license system fault is not corrected before all of the accumulated credit is consumed, the application is terminated at time 22 on the graph.

Figure 5:
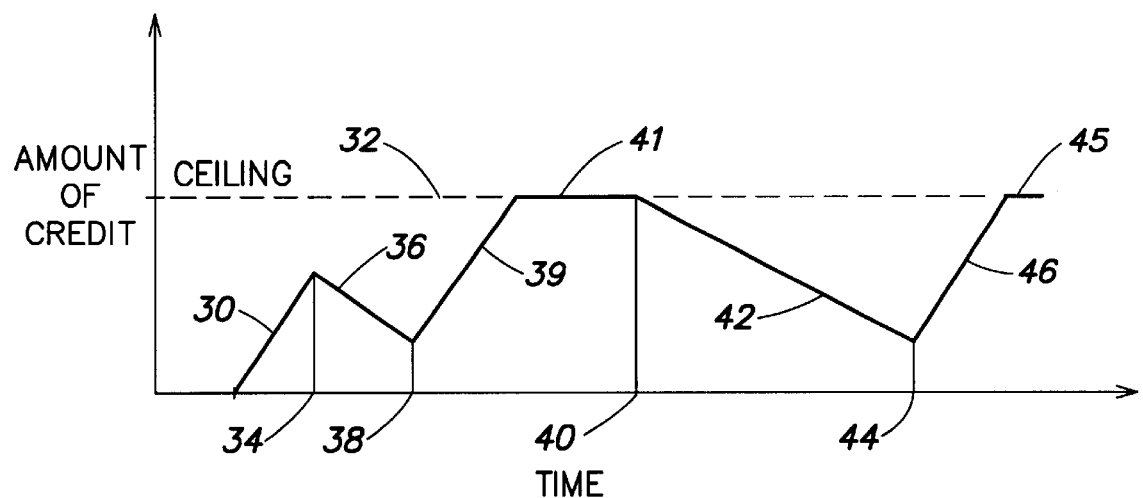
FIG. 5 is a graph which shows a portion of the life of an application in accordance with the present invention.

FIG. 5 shows an example of how credit is accumulated and consumed over the working life of an application. While the application is running under a license, credit is accumulated, as shown by the slope of line 30. As long as the application is operating under the license, credit is accumulated, up to the accumulation ceiling, indicated by dashed line 32. In the event of a license system fault, at time 34, the accumulated credit is consumed at the rate of graced consumption, shown by the slope of line 36, until the license system fault is corrected, at time 38. Once the fault is corrected, the application resumes accumulating credit, as indicated by line 39. When line 39 reaches the credit ceiling 32, the slopes become flat (line 41). In the event that the application is made inactive at point 40 of FIG. 2, the accumulated credit is consumed at the rate of extinct consumption, indicated by the slope of line 42. When the application is made active again, at point 44, credit accumulation resumes, as indicated by line 46, until it again reaches the credit ceiling at line 45. In the example shown in FIG. 5, the rate of graced consumption is greater than the rate of extinct consumption.

As shown in FIG. 5, when an authorized user is running a critical application which is being monitored according to the present embodiment, as long as any license system faults are promptly corrected, the application will not be terminated, and the user will have uninterrupted use of the critical application.

On the other hand, if an unauthorized user is running the application, or if a license system fault is not promptly corrected, once all accumulated credit tokens are consumed during a license system fault, the application is terminated, and the user will no longer have access to the application. Therefore, the interests of both the authorized critical application user and the software vendor, as discussed above, are appropriately addressed.

The credit which is accumulated must be stored in a secure and locally-available store (e.g., memory), such as a host on the network. If the credit is not locally stored, the event which caused the license system fault could also cause the accumulated credit to be unavailable to the user. Also, the credit should be secured to protect the software vendor from tampering. The methods used for securing the store include encryption or a form of authorization.

Figure 6:
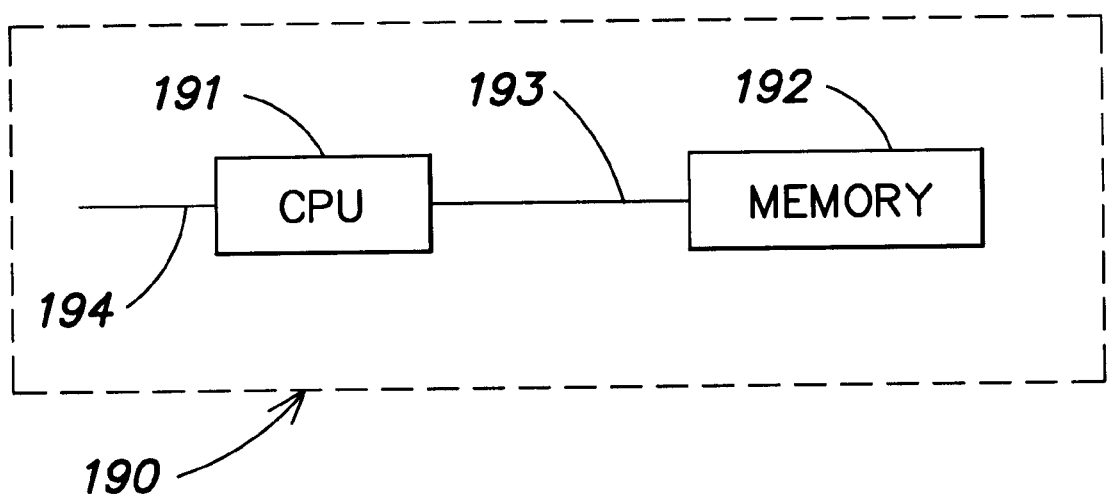
FIG. 6 is a block diagram of a computer system in which the present invention may be implemented.

Any of the above embodiments may be implemented in a general purpose computer 190 as shown in FIG. 6. The computer may include a computer processing unit (CPU) 191, memory 192, such as a floppy disk, compact disk, or hard drive, a processing bus 193 by which the CPU can access the memory 192, and a bus 194 to provide access to a network.

Having thus described the invention, various alterations, modifications and improvements will occur to those skilled in the art which are intended to be within the scope of the invention. While the invention has been described as monitoring a mission-critical software application, the invention may be used to monitor the use of any application which is run on a network. Accordingly, the foregoing description is by way of example only, and is not intended to be limiting.

What is claimed is:

1. A method of enforcing a floating license of a software application executing on a computer system, the method comprising the steps of:
   accumulating credit during a first period wherein said application is being used under a first condition;
   consuming said accumulated credit while using said application under a second condition different than said first condition;
   prohibiting the execution of the software application when the accumulated credit is exhausted; and
   accumulating additional usage credit during a second period following the consuming operation.

2. The method of claim 1, wherein said first condition comprises use of said application when said license is valid.

3. The method of claim 2, wherein said second condition comprises use of said application when said license is invalid.

4. The method of claim 3, wherein during said accumulating step, credit is accumulated at a predetermined accumulation rate.

5. The method of claim 4, wherein, during said consuming step, said accumulated credit is consumed at a predetermined consumption rate.

6. The method of claim 5, wherein said consumption rate is adjustable within a first range when said application is in use and said consumption rate is adjustable within a second range when said application is not in use.

7. The method of claim 6, wherein said consumption rate within said first range is greater than said consumption rate within said second range.

8. The method of claim 7, wherein said credit comprises units of time.

9. The method of claim 5, wherein said consumption rate is constant over time.

10. The method of claim 5, wherein said consumption rate increases over time.

11. A method for enforcing a floating license of a computer application executing on a computer system, the method comprising the steps of:
    accumulating usage credit during a first period wherein said application is being used and while said floating license is valid;
    consuming said usage credit while said application is being used and while said floating license is invalid;
    prohibiting the execution of the computer application when the accumulated usage credit is exhausted; and
    accumulating additional usage credit during a second period following the consuming operation.

12. The method of claim 11, wherein said usage credit is consumed at a first rate while said floating license is invalid and said usage credit is consumed at a second rate while said application is not in use.

13. The method of claim 12, wherein said usage credit is time-based.

14. The method of claim 13, wherein said first rate is different than said second rate.

15. The method of claim 14, wherein said first rate is greater than said second rate.

16. The method of claim 11, wherein said accumulating step is subject to an upper limit, wherein once a level of said accumulated usage credit reaches said upper limit, said accumulation step is suspended.

17. The method of claim 16, wherein when said usage credit falls below said upper limit, said accumulating step is resumed when said application is being used while said floating license is valid.

18. The method of claim 11, wherein said consuming is performed at a rate which is constant over time.

19. The method of claim 11, wherein said consuming is performed at a rate which increases over time.

20. A system for managing a floating license for a computer application executing on a computer system, the system comprising:
- means for accumulating usage credit during a first period wherein said application is being used while said floating license is valid;
- means for consuming said usage credit while said application is used and while said floating license is invalid;
- means for prohibiting the execution of the application when the accumulated credit is exhausted; and
- means for accumulating usage credit during a second period following consuming said usage credit.

21. The system of claim 20, wherein said consuming means consumes said usage credit at a first rate while said application is being used while said floating license is invalid and at a second rate while said application is not in use.

22. The system of claim 21, wherein said usage credit is time-based.

23. The system of claim 22, wherein said first rate is different than said second rate.

24. The system of claim 23, wherein said first rate is greater than said second rate.

25. The system of claim 20, wherein said means for accumulating is subject to an upper limit, wherein once a level of said accumulated usage credit reaches said upper limit, the operation of said accumulation means is suspended.

26. The system of claim 20, wherein when said usage credit falls below said upper limit, operation of said accumulating means is resumed when said application is used while said floating license is valid.

27. The system of claim 20, wherein said consuming means consumes said usage credit at a rate which is constant over time.

28. The system of claim 20, wherein said consuming means consumes said usage credit at a rate which increases over time.

29. A computer program product comprising a computer-readable medium having computer program logic thereon for enabling a processor in a computer system to manage a license of a software application, the product comprising:
- means for determining a finite grace period that is proportional to a length of operation of said software application while said license is valid; and
- means for allowing operation of said software application for said finite grace period when said license is invalid.

30. The product of claim 29, further comprising means for terminating said software application when said finite grace period expires.

31. A system for managing a floating license for a computer application executing on a computer system, the system comprising:
- an accumulating device which accumulates usage credit during a first period wherein said application is being used and while said floating license is valid;
- a consumption device which consumes said usage credit while said application is used and while said floating license is invalid, wherein the accumulating device accumulates additional usage credit during a second period following the consumption of at least some of the usage credit; and
- a controller which controls operation of said accumulation device and said consumption device.

32. A method for managing a floating license of a computer application executing on a computer system, the method comprising steps of:
- determining a finite grace period that is proportional to a length of operation of said software application while said license is valid; and
- allowing operation of said software application for said finite grace period when said license is invalid.

33. The method of claim 32, further comprising the step of terminating said software application when said finite grace period expires.

* * * * *